(12) United States Patent
Park et al.

(10) Patent No.: US 7,373,187 B2
(45) Date of Patent: May 13, 2008

(54) PORTABLE DIGITAL COMMUNICATION APPARATUS HAVING SLIDING/ROTATIONAL HINGE MEANS

(75) Inventors: Yun-Ho Park, Suwon-si (KR); Young-Seok Yoon, Anyang-si (KR); Jong-Woo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 374 days.

(21) Appl. No.: 10/967,399

(22) Filed: Oct. 18, 2004

(65) Prior Publication Data
US 2005/0113156 A1 May 26, 2005

(30) Foreign Application Priority Data
Nov. 24, 2003 (KR) ............ 10-2003-0083758

(51) Int. Cl.
*H04M 1/00* (2006.01)
(52) U.S. Cl. .............. 455/575.4; 455/575.3; 455/566
(58) Field of Classification Search .......... 455/90, 455/550, 575, 566, 556.1, 575.4
See application file for complete search history.

(56) References Cited
U.S. PATENT DOCUMENTS
2002/0102946 A1* 8/2002 SanGiovanni ............ 455/90
2003/0114198 A1* 6/2003 Han ..................... 455/566
2004/0259590 A1* 12/2004 Middleton ............ 455/556.1

FOREIGN PATENT DOCUMENTS
WO WO 01/84269 11/2001
WO WO 03/050665 6/2003

* cited by examiner

*Primary Examiner*—Joseph Feild
*Assistant Examiner*—Phuoc Doan
(74) *Attorney, Agent, or Firm*—The Farrell Law Firm, PC

(57) ABSTRACT

A portable digital communication apparatus including a first housing having a lateral surface and other lateral surfaces disposed adjacently to it; a second housing having a lateral surface and other lateral surfaces disposed adjacently to it; a hinge unit adapted to connect the first and second housings in such a manner that they can be rotated in a direction approaching or away from each other; and first and second sliding/rotational hinge means positioned between the hinge unit and the first and second housings and adapted to position the hinge unit adjacent and parallel to a lateral surface or other lateral surface, both of which are chosen from the lateral surfaces of the first and second housings, wherein the hinge unit has a first hinge axis which is oriented parallel to the chosen lateral surface or the other chosen lateral surface.

20 Claims, 9 Drawing Sheets

PORTABLE DIGITAL COMMUNICATION APPARATUS HAVING SLIDING/ROTATIONAL HINGE MEANS

PRIORITY

This application claims priority to an application entitled "A Portable Digital Communication Apparatus Having A Sliding/Rotational Hinge Means" filed with the Korean Intellectual Property Office on Nov. 24, 2003 and assigned Serial No. 2003-83758, the contents of which are hereby incorporated by reference.

BACKGROUND OF THE INVENTION

1. Field of the Invention

The present invention relates to portable communication apparatuses, such as cellular phones, PDAs (personal digital assistants), HHPs (hand held phones), and PCS (personal communication service) phones, and more particularly to a portable digital communication apparatus having a hinge means capable of making combined sliding and rotation movements.

2. Description of the Related Art

In general, a "portable communication apparatus" refers to an electronic apparatus which a user can carry with him/her to perform wireless communication with a desired partner. In consideration of portability, the design of such portable communication apparatuses have become more compact, slimmer, and lighter, but also now include multi-media availability, having a wider variety of functions. In particular, future portable communication apparatuses are expected to incorporate greater multi-functionality and multi-purpose utilization, as well as being more compact and lighter, and also will be designed to incorporate various multimedia environments or Internet environments. Additionally, such portable communication apparatuses are now recognized by some people as a nearly indispensable commodity which must always be carried.

Conventional portable communication apparatuses may be classified into various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge unit. The folder-type portable communication apparatus has a folder coupled to a single bar-shaped housing by a hinge unit in such a manner that the folder can be rotated in order to be folded to or unfolded from the housing.

Further, portable communication apparatuses may be classified into neck wearable type communication apparatuses and wrist wearable type communication apparatuses according to the position at or the way in which a user puts on the communication apparatus. The neck wearable type communication apparatus is one which a user wears around the neck using a string or lanyard, while the wrist wearable type communication apparatus is one which a user wears on the wrist.

Additionally, portable communication apparatuses may be classified into rotation-type communication apparatuses and sliding-type communication apparatuses according to the manner in which the user opens and closes the communication apparatuses. In the rotation-type portable communication apparatus, two housings are coupled to each other in such a manner that one housing rotates to be opened or closed relative to the other while the housings remain facing each other. In the sliding-type portable communication apparatus, two housings are coupled to each other in a manner that one housing slides to be opened or closed relative to the other. These variously classified portable communication apparatuses can be easily understood by those skilled in the art.

Meanwhile, conventional portable communication apparatuses may now include a function of transmitting data at a high speed in addition to the basic function of performing voice communication. In other words, according to increased demand by consumers, portable communication apparatuses may now provide a service using a wireless communication technology capable of transmitting data at a high speed.

Recent portable communication apparatuses have also been equipped with a camera lens which enables the communication apparatuses to transmit an image signal. That is, current conventional portable communication apparatuses may have an imbedded or external camera lens or a photographing means which enables a user to make an image communication with a desired partner or to take a photograph of a desired subject.

However, conventional portable communication apparatuses have a disadvantage in that, once one type of a portable communication apparatus is purchased, a user has little choice but to keep using that apparatus in a monotonous way until he/she decides to purchase a different type of portable communication apparatus. Conventional portable communication apparatuses cannot combine features in an add-on manner; for example, sliding-type apparatuses cannot be combined with rotation-type apparatuses. Accordingly, a need exists to provide a user with a new type of portable communication apparatus, which combines the advantages of sliding-type and rotation-type portable communication apparatuses.

SUMMARY OF THE INVENTION

Accordingly, the present invention has been made to solve the above-mentioned problems occurring in the prior art, and an object of the present invention is to provide a portable digital communication apparatus which has a hinge means capable of making combined sliding and rotation movements and is more convenient to use, by combining the advantages of sliding-type and rotation-type apparatuses.

Another object of the present invention is to provide a portable digital communication apparatus having a hinge unit positioned on a lateral surface, which is chosen from a lateral surface of a housing and other lateral surfaces disposed adjacently to it, so that a user can conveniently operate keys or read displayed data in a phone-mode or in an Internet-mode.

In order to accomplish this object, there is provided a portable digital communication apparatus which includes a first housing having a lateral surface and other lateral surfaces disposed adjacent to it; a second housing having a lateral surface and other lateral surfaces disposed adjacent to it; a hinge unit adapted to connect the first and second housings in such a manner that they can be rotated towards or away from each other; and first and second sliding/rotational hinge means positioned between the hinge unit and the first and second housings and adapted to position the hinge unit adjacent and parallel to one of the lateral surfaces or other lateral surfaces, chosen from the lateral surfaces of the first and second housings, wherein the hinge unit has a first hinge axis which is oriented parallel to the chosen lateral surface.

In accordance with another aspect of the present invention, there is provided a portable digital communication apparatus comprising: a first housing extending in a first direction; a second housing which faces the first housing and is adapted to be opened/closed with respect to the first housing about a hinge unit; and a sliding/rotational hinge means positioned between the first and second housings and the hinge unit to position the hinge unit adjacent and parallel to a lateral surface, which is chosen from lateral surfaces of the first and second housings, through at least one linear sliding movement and a rotational movement.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
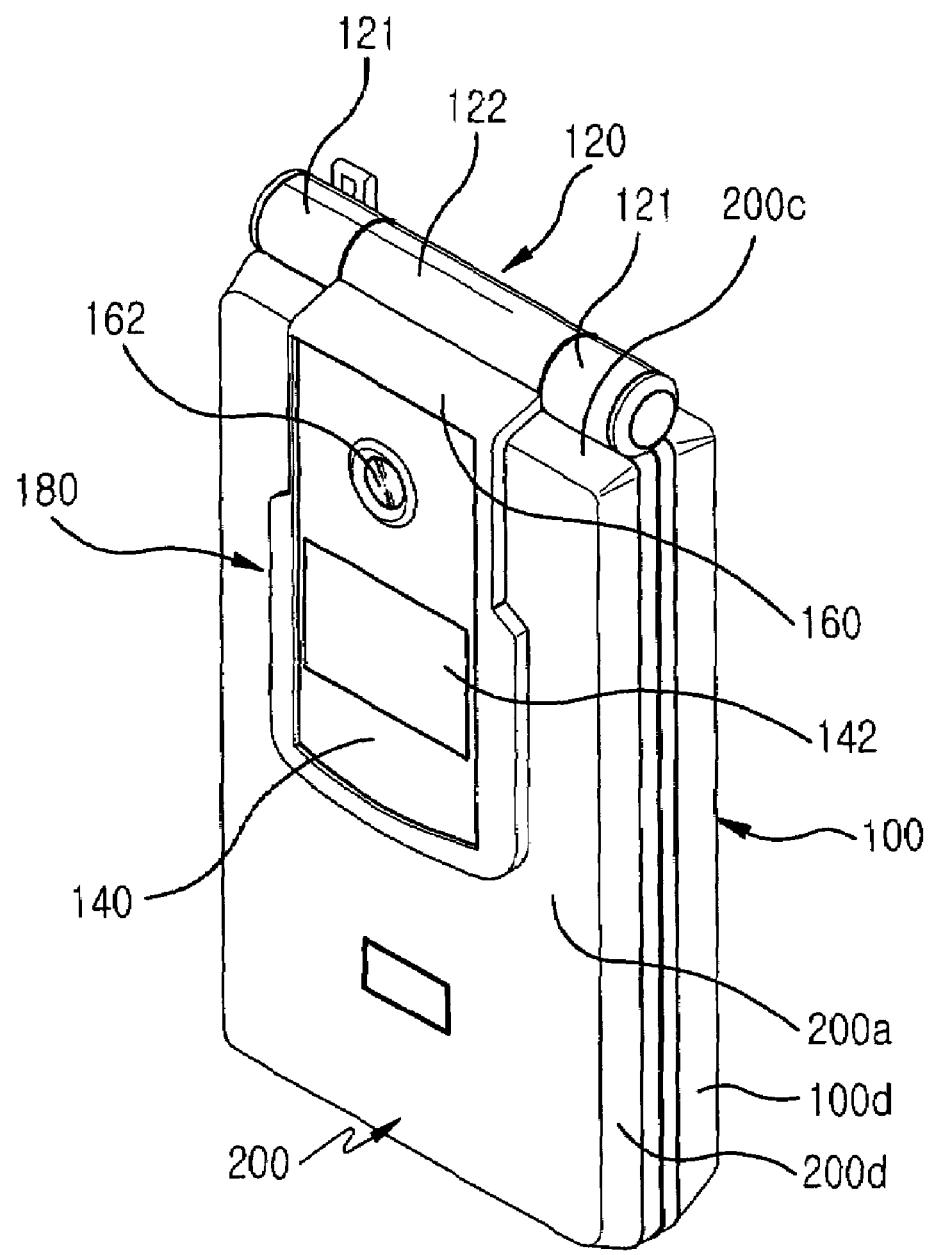
FIG. 1 is a perspective view showing a front contour of a portable digital communication apparatus according to a preferred embodiment of the present invention.

Hereinafter, preferred embodiments of the present invention will be described with reference to the accompanying drawings. In the following description of the present invention, a detailed description of known functions and configurations incorporated herein will be omitted when it may make the subject matter of the present invention unclear.

A portable digital communication apparatus according to the present invention has a hinge unit adapted to open/close its two housings and a sliding/rotational hinge means adapted to position the hinge unit on a lateral surface chosen from lateral surfaces of the housings.

In other words, the hinge unit is selectively positioned adjacent and parallel to the chosen lateral surface of the housings by means of the sliding/rotational hinge means.

As shown in FIGS. 1 to 5, a portable digital communication apparatus according to the present invention comprises: a first housing 100; a second housing 200; a hinge unit 120 connecting the first and second housings 100 and 200 in such a manner that they can be rotated about a first hinge axis A1 in a direction approaching or away from each other; and first and second sliding/rotational hinge means 170 and 180 positioned between the hinge unit 120 and the first and second housings 100 and 200 and adapted to position the hinge unit 120 adjacent and parallel to a lateral surface chosen from lateral surfaces of the first and second housings 100 and 200. The first housing 100 has a shape of a flat cuboid. In other words, it is shaped like a bar. The first housing 100 includes an upper surface 100a, a lower surface 100b, and at least one lateral surface 100c, 100d, all of which have a rectangular shape. Lateral surface 100c and lateral surfaces 100d are disposed adjacent to each other. The lateral surfaces 100c, 100d are also disposed adjacent to the upper surface 100a and the lower surface 100b.

The first housing 100 is generally provided with, on its upper surface 100a, a key array 102 composed of a number of keys. The number of keys composing the key array 102 is preferably 30-40 or more. The key array 102 is used to input data during a variety of communication modes, including voice communication, video communication, Internet, mail transmission, and the like.

The first sliding/rotational hinge means 170 (FIG. 2) is positioned between the lower surface 100b and the hinge unit 120 and includes a first hinge portion 130 and a first connection member 150 extending from the first hinge portion 130. The first hinge portion 130 is in facing relation to the lower surface 100b and the first connection member 150 is integral to the hinge unit 120.

The second housing 200 has a shape of a flat cuboid similar to the shape of first housing 100. The second housing 200 includes an upper surface 200a, a lower surface 200b, and a number of lateral surfaces 200c, 200d, all of which have a rectangular shape. Lateral surface 200c and lateral surfaces 200d are disposed adjacent. The lateral surfaces 200c, 200d are also disposed adjacent to the upper surface 200a and the lower surface 200b. The second sliding/rotational hinge means 180 is positioned between the lower surface 200b of the second housing and the hinge unit 120 and includes a second hinge portion 140 and a second connection member 160 extending from the second hinge portion 140. The second hinge portion 140 is in facing relation to the upper surface 200a and the second connection member 160 is integral to the hinge unit 120.

The second hinge portion 140 is preferably provided with an auxiliary display unit 142 and the second connection member 160 is provided with a camera lens 162. The auxiliary display unit 142 and the camera lens 162 are preferably disposed adjacent to each other. The auxiliary display unit 142 is composed of an LCD and is adapted to display information, which a user may check without opening the second housing 200, such as data regarding the charge level of a battery, data on date and time, data regarding arrival of a message, data regarding an antenna's reception sensitivity, data regarding vibration mode, and the like.

Figure 3:
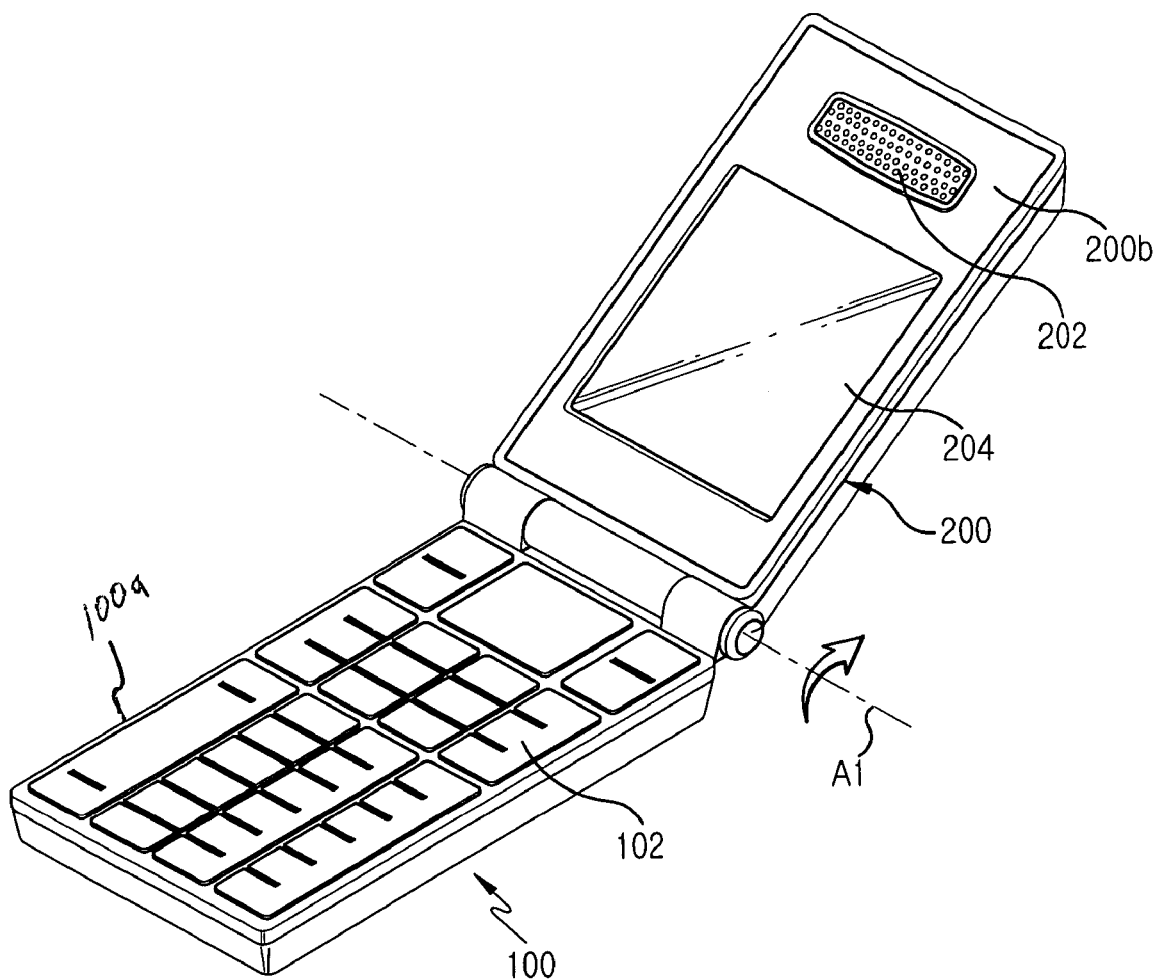
FIGS. 3 and 4 are front and rear perspective views showing the portable digital communication apparatus shown in FIG. 1, respectively, wherein its second housing is completely opened.
Figure 4:
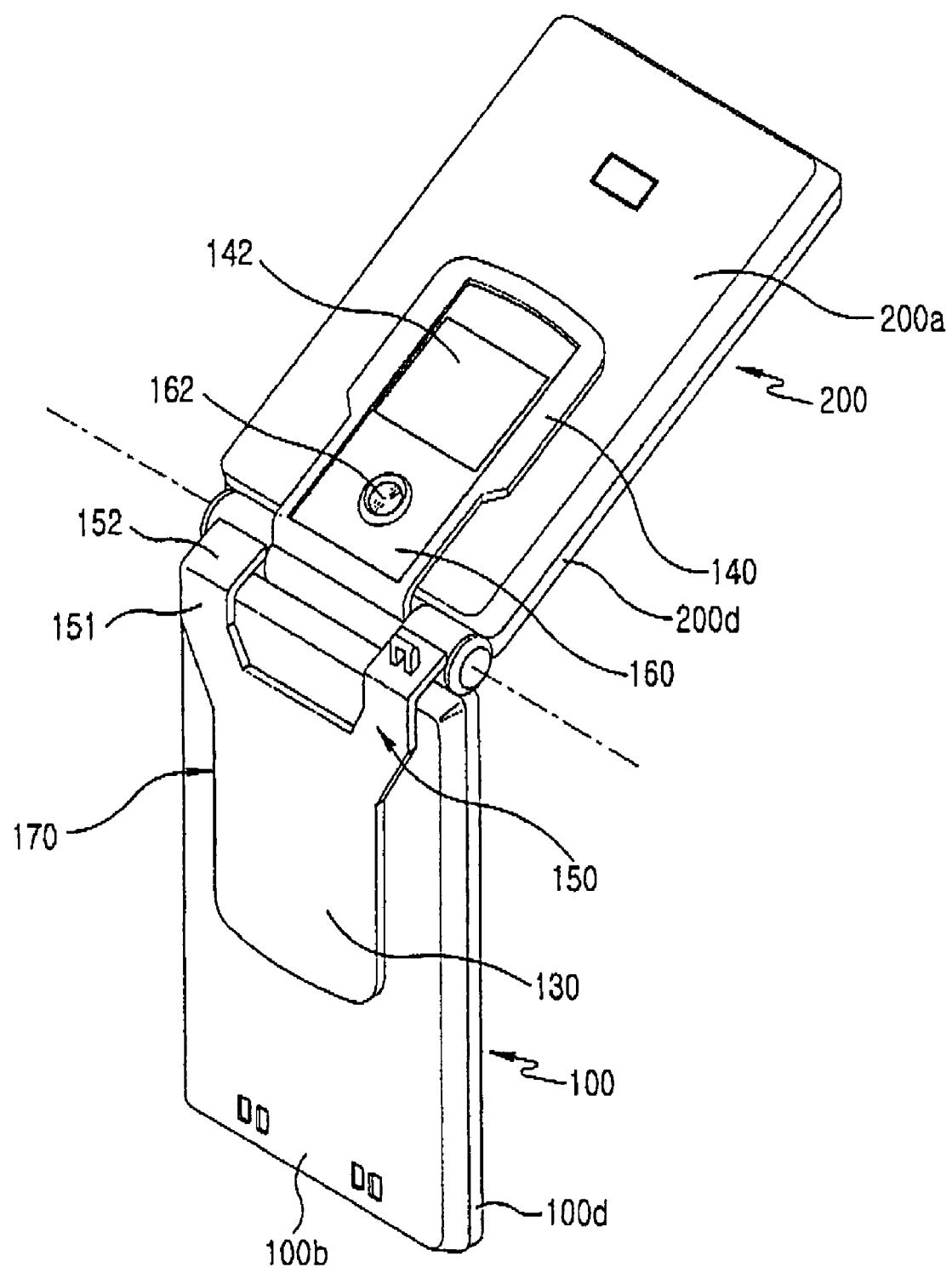

The second housing is provided with, on its lower surface 200b, a speaker unit 202 and a main display unit 204 disposed adjacently to the speaker unit 202 (FIG. 3). The main display unit 204 may be composed of an LCD, a touch screen, or a hologram screen. The main display unit 204 has a size larger than that of the auxiliary display unit 142.

The sliding/rotational hinge means is adapted to position the hinge unit 120 adjacent and parallel to a lateral surface of the first and second housings 100 and 200. The sliding/rotational hinge means is composed of first sliding/rotational hinge means 170 and second sliding/rotational hinge means 180, which is disposed in symmetry with the first sliding/rotational hinge means 170 about the first and second housings. Both of the first and second sliding/rotational hinge means 170 and 180 are integral to the hinge unit 120.

Figure 2:
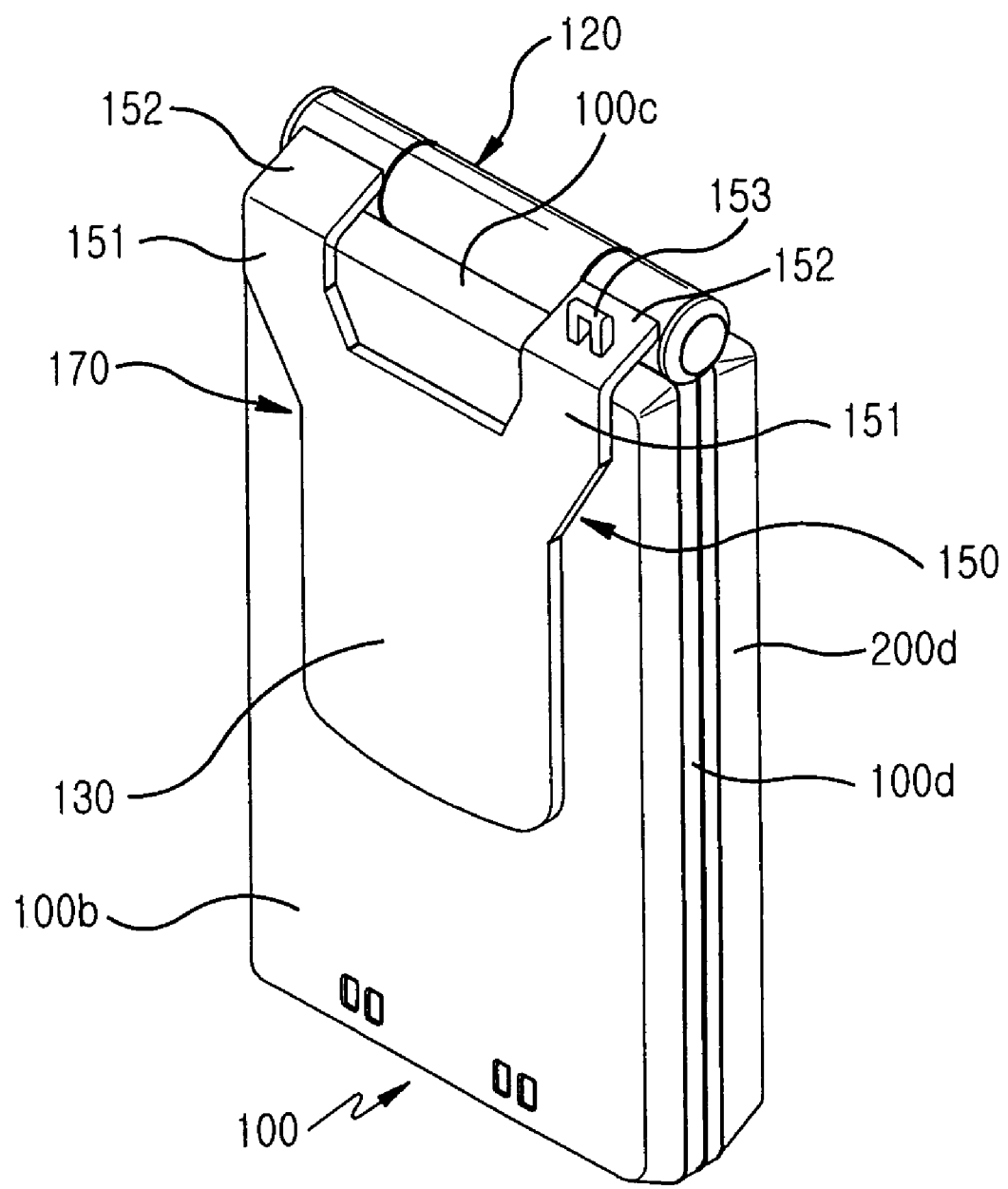
FIG. 2 is a perspective view showing a rear contour of a portable digital communication apparatus according to a preferred embodiment of the present invention.

As seen in FIG. 2, the first sliding/rotational hinge means 170 is composed of a first hinge portion 130, which is positioned on the lower surface 100b of the first housing and adapted to be rotated while continuously facing the lower surface 100b, and a first connection member 150, which is adapted to integrally connect the first hinge portion 130 to the hinge unit 120.

The first connection member 150 is composed of a pair of slant members 151, which extend from the first hinge portion 130 and face the lower surface 100b of the first housing, and a pair of parallel members 152, which extend from ends of the slant members 151 and are connected to the hinge unit 120.

Preferably the first sliding/rotational hinge means 170 is provided with, specifically on one of its pair of parallel members 152, an antenna unit 153. The antenna unit 153 thus accompanies the first sliding/rotational hinge means 170 during movement.

Referring to FIG. 1, the second sliding/rotational hinge means 180 is composed of a second hinge portion 140, which is positioned on the upper surface 200a of the second housing in facing relation, and a second connection member 160, which integrally connects the second hinge portion 140 to the hinge unit 120. The second hinge portion 140 is connected to the second housing 200 in such a manner that it can be rotated while continuously facing the upper surface 200a of the second housing.

Figure 5:
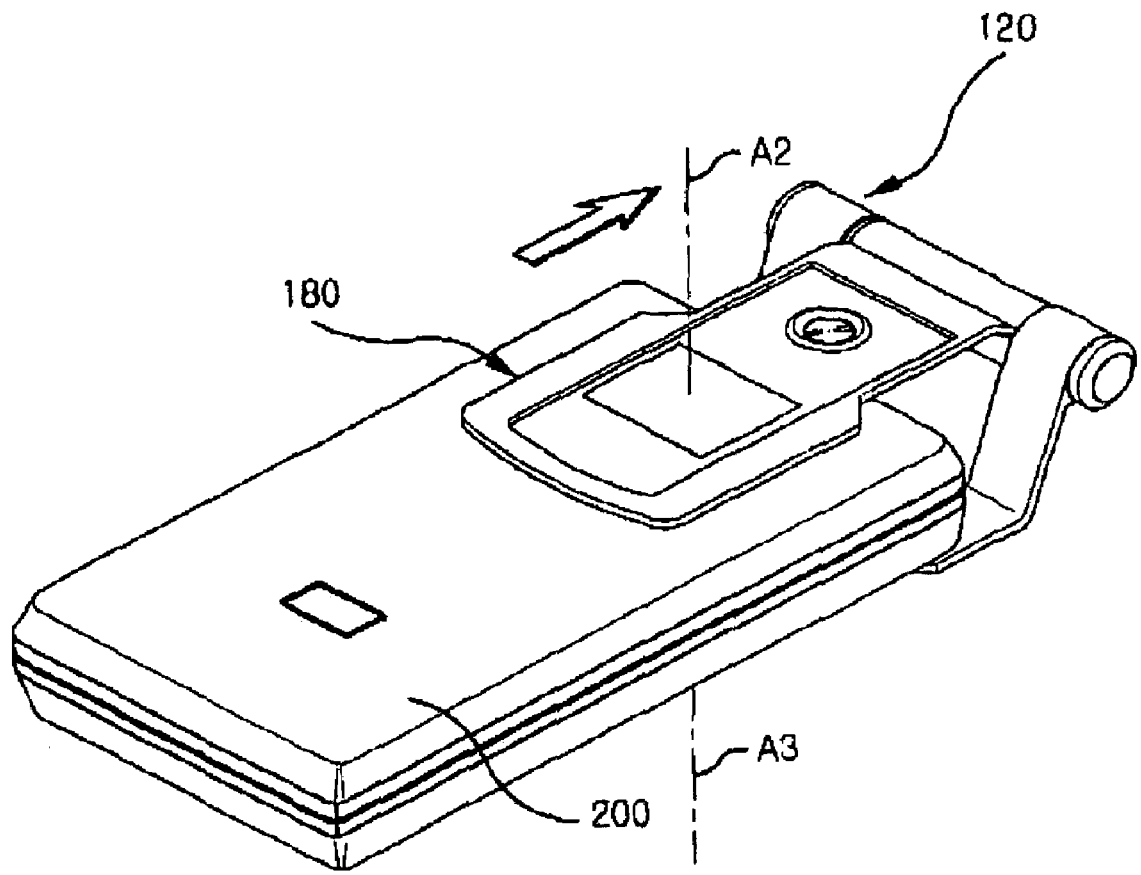
FIG. 5 is a perspective view showing a sliding/rotational hinge means, after having performed a sliding movement along a longitudinal direction, according to a preferred embodiment of the present invention.
Figure 6:
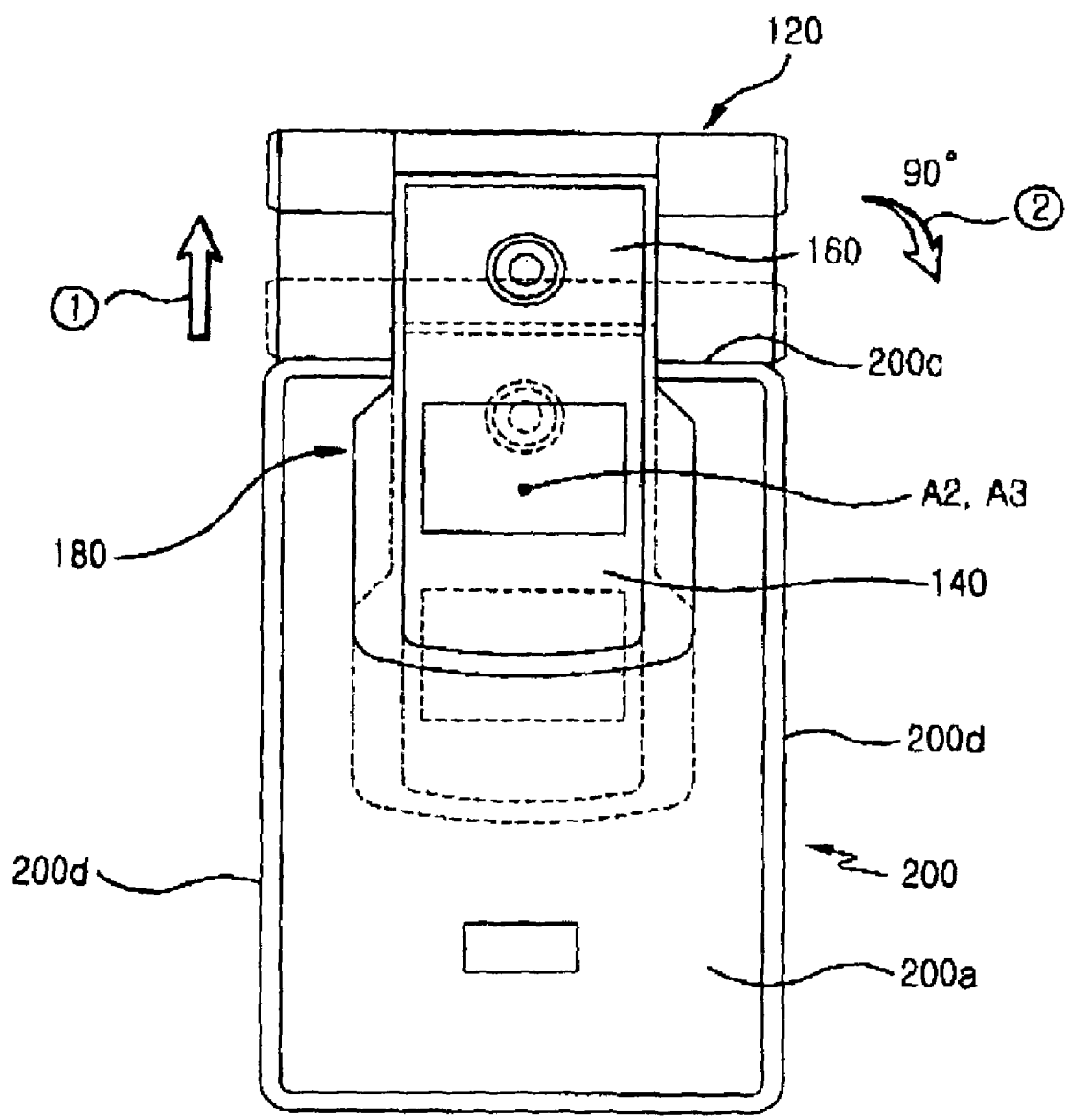
FIGS. 6 and 7 are top views showing a sliding/rotation procedure of a sliding/rotational hinge means, respectively.
Figure 7:
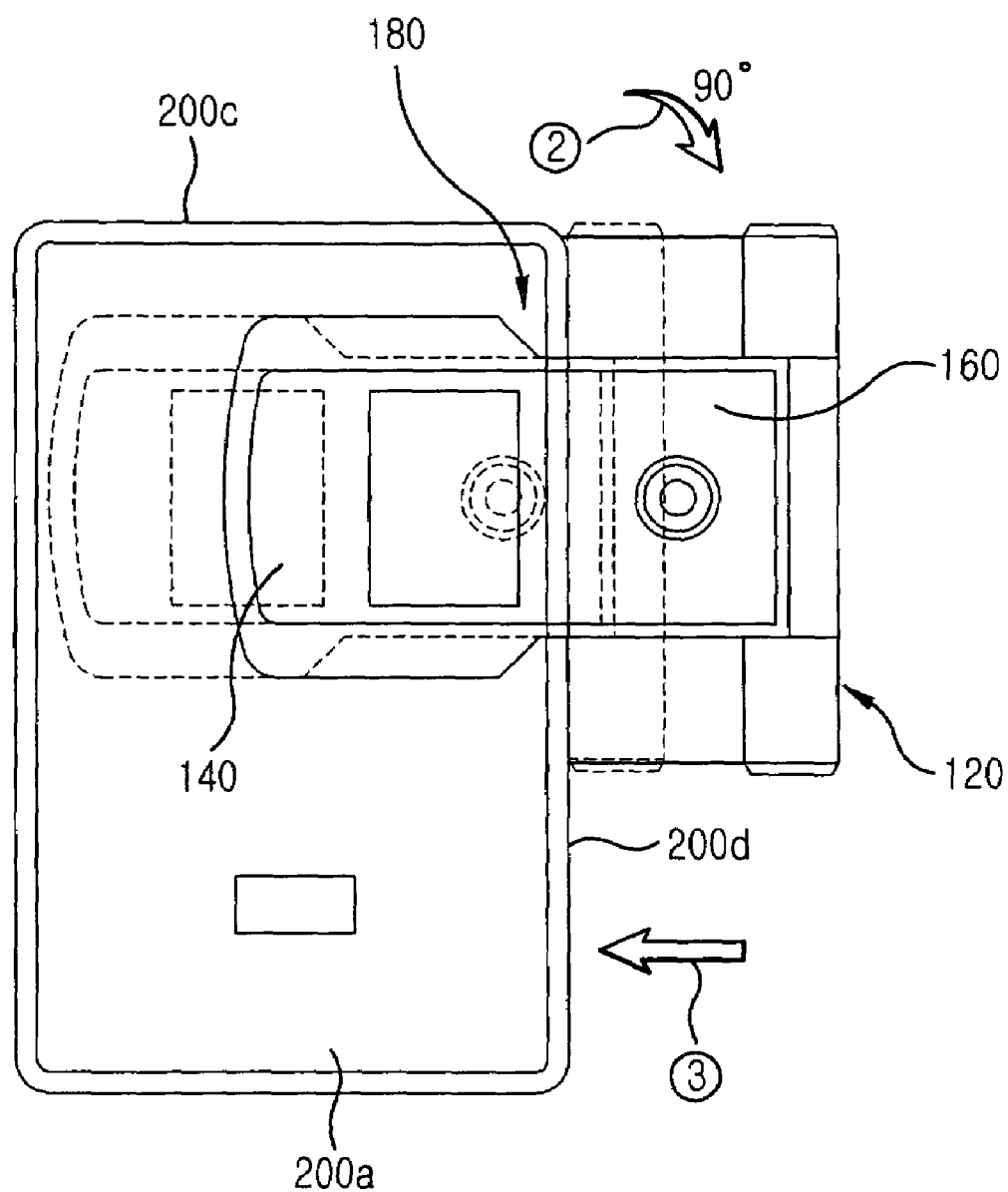

As shown in FIGS. 5 to 7, the first and second sliding/rotational hinge means 170 and 180 are adapted to position the hinge unit 120 adjacent and parallel to a lateral surface of the first and second housings 100 and 200, through at least one sliding movement and a rotational movement. Preferably, first and second sliding/rotational hinge means 170 and 180 are adapted to move linearly, as shown in FIG. 5.

Figure 8:
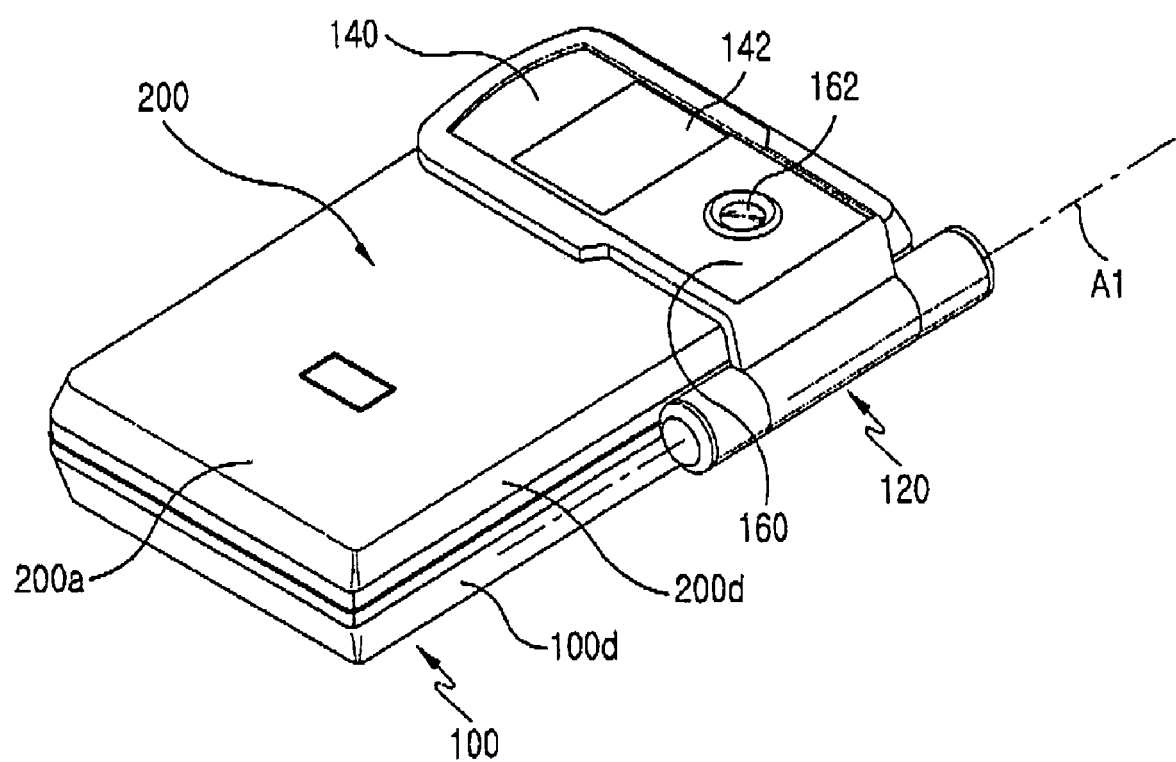
FIG. 8 is a perspective view showing a second housing, having been moved by a sliding/rotational hinge means and is completely closed.

Specifically, the first and second sliding/rotational hinge means 170 and 180 perform a first linear sliding movement to move the hinge unit 120 in a longitudinal direction (indicated by arrow mark (①) in FIG. 6) away from lateral surfaces 100c, 200c of the first and second housings 100 and 200; perform a sliding rotational movement (indicated by arrow mark ② in FIGS. 6 and 7) to rotate the hinge unit 120 at an angle, specifically about 90°; and perform a second linear sliding movement (indicated by arrow mark ③ in FIG. 7) to move the hinge unit 120 in a direction approaching lateral surfaces 100d, 200d of the first and second housings 100 and 200, to be disposed adjacently to the lateral surfaces 100d, 200d (FIG. 8).

The first linear sliding movement is in a direction parallel to a longitudinal direction of the first and second housings 100 and 200 and the second linear sliding movement is in a direction perpendicular to the longitudinal direction of the first and second housings 100 and 200.

A sliding movement distance of the first and second sliding/rotational hinge means 170 and 180 depends on their rotational radius.

When the first and second sliding/rotational hinge means 170 and 180 have completely rotated the hinge unit 120 from the lateral surfaces 100c, 200c of the first and second housings 100 and 200, to the lateral surfaces 100d, 200d of the first and second housings 100 and 200, as shown in FIGS. 7 and 8, the hinge unit 120, which is positioned on the other lateral surface, defines an open space 104 (FIG. 9) between parts of the first and second housings 100 and 200.

The first sliding/rotational hinge means 170 has a first rotation hinge axis which is perpendicular to the first hinge axis A1 and the second sliding/rotational hinge means 180 has a second rotation hinge axis which is perpendicular to the first hinge axis A1. The first and second rotation hinge axes are rotated about the first hinge axis A1. The first rotation hinge axis is oriented perpendicularly to the lower surface 100b of the first housing and the second rotation hinge axis is oriented perpendicularly to the upper surface 200a of the second housing. Specifically, the first rotation hinge axis A2 is oriented perpendicularly to a center portion of the first hinge unit 130 and the second rotation hinge axis A3 is oriented perpendicularly to a center portion of the second hinge portion 150. The first and second rotation hinge axes are positioned coaxially.

Figure 9:
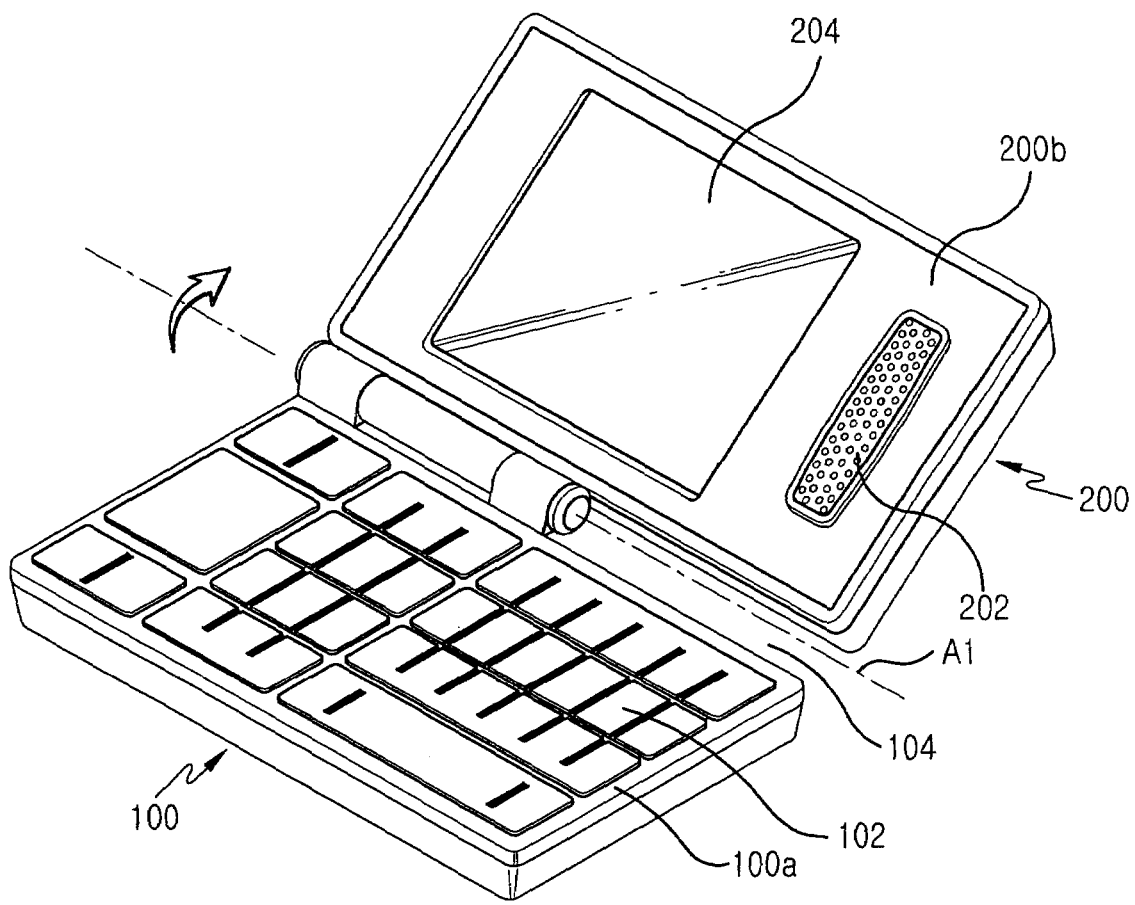
FIG. 9 is a perspective view showing a second housing, having been moved by a sliding/rotational hinge means and is completely opened.

FIGS. 1 to 4 show the hinge unit 120 positioned adjacent and parallel to lateral surfaces 100c, 200c of the first and second housings 100 and 200, while FIGS. 8 and 9 shows the hinge unit 120 positioned adjacent to and parallel to lateral surfaces 100d, 200d of the first and second housings 100 and 200.

The hinge unit 120 is composed of a pair of side hinge arms 121 and a center hinge arm 122, which is positioned between the pair of side hinge arms 121. Each of the side hinge arms 121 is connected to each of the pair of parallel members 152 of the first connection member 150 and the center hinge arm 122 is connected to the second connection member 160 of the second housing. The center hinge arm 122 is provided with a hinge module (not shown) therein to provide power necessary for opening/closing the second housing 200.

Consequently, a user can position the hinge unit 120 adjacently and parallel to a lateral surface or other lateral surface, both of which are chosen from the lateral surfaces 100c, 200c of the first and second housings, so that he/she can operate keys or read displayed data in a more convenient manner.

As mentioned above, the present invention provides a portable digital communication apparatus having a hinge unit adapted to be positioned, by means of a sliding/rotational hinge means, adjacent and parallel to a lateral surface chosen from lateral surfaces of housings, so that a user can conveniently operate keys or read displayed data, especially in an Internet-mode.

In addition, as an alternative embodiment, it is possible to slide only second housing 200, rotate second housing 200, and then slide second housing 200 so that second housing 200 opens and closes while in a position perpendicular to first housing 100.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable digital communication apparatus comprising:
   a first housing having a first lateral surface and a second lateral surface generally perpendicular to the first lateral surface;
   a second housing;
   a hinge unit adapted to connect the first and second housings in such a manner that the first and second housings can be rotated towards or away from each other in a first position and in a second position, the hinge unit having a first hinge axis being oriented parallel to the first lateral surface in the first position and parallel to the second lateral surface in the second position;

a first sliding/rotational hinge means positioned between the hinge unit and the first housing; and a second sliding/rotational hinge means positioned between the hinge unit and the second housing, the first and second sliding/rotational hinge means for positioning the hinge unit adjacent and parallel to the first lateral surface in the first position and to the second lateral surface in the second position through at least one linear sliding movement and a rotational movement.

2. A portable digital communication apparatus as claimed in claim 1, wherein the first and second sliding/rotational hinge means are adapted to slide together linearly along a longitudinal direction of the first and second housings.

3. A portable digital communication apparatus as claimed in claim 1, wherein each of the first and second sliding/rotational hinge means is adapted to slide or rotate while continuously facing each of a lower surface of the first housing and an upper surface of the second housing, respectively.

4. A portable digital communication apparatus as claimed in claim 1, wherein each of the first and second sliding/rotational hinge means is integral to the hinge unit.

5. A portable digital communication apparatus as claimed in claim 1, wherein the first sliding/rotational hinge means is composed of a first hinge portion positioned on a lower surface of the first housing in facing relation and a first connection member adapted to integrally connect the first hinge portion to the hinge unit.

6. A portable digital communication apparatus as claimed in claim 5, wherein the first hinge portion is connected to the first housing in such a manner that it can be rotated while continuously facing the first housing.

7. A portable digital communication apparatus as claimed in claim 5, wherein the first connection member is composed of a pair of slant members which extend from the first hinge portion and face the lower surface of the first housing and a pair of parallel members which extend from ends of the slant members and are connected to the hinge unit.

8. A portable digital communication apparatus as claimed in claim 1, wherein the second sliding/rotational hinge means is composed of a second hinge portion positioned on an upper surface of the second housing in facing relation and a second connection member adapted to integrally connect the second hinge portion to the hinge unit.

9. A portable digital communication apparatus as claimed in claim 8, wherein the second hinge portion is connected to the second housing in such a manner that it can be rotated while continuously facing the second housing.

10. A portable digital communication apparatus as claimed in claim 1, wherein the first housing is provided with, on its upper surface, a first key array composed of a number of keys and the second housing is provided with, on its lower surface, a speaker unit and a main display unit disposed adjacent to the speaker unit.

11. A portable digital communication apparatus as claimed in claim 8, wherein the first hinge portion is provided with an auxiliary display unit.

12. A portable digital communication apparatus as claimed in claim 1, wherein the second sliding/rotational hinge means is provided with a camera lens.

13. A portable digital communication apparatus as claimed in claim 1, wherein the first sliding/rotational hinge means has a first rotation hinge axis which is oriented perpendicularly to the first hinge axis, the second sliding/rotational hinge means has a second rotation hinge axis which is oriented perpendicularly to the first hinge axis, and the first and second rotation hinge axes are rotated about the first hinge axis.

14. A portable digital communication apparatus as claimed in claim 1, wherein the first sliding/rotational hinge means is provided with an antenna unit.

15. A portable digital communication apparatus comprising:

a first housing extending in a direction;

a second housing which faces the first housing and is adapted to be opened/closed with respect to the first housing about a first hinge axis; and a sliding/rotational hinge means positioned between the first and second housings and the hinge unit to position the hinge unit adjacent and parallel to a first lateral surface of the first and second housings in a first position, and a second lateral surface of the first and second housings in a second position, through at least one linear sliding movement and a rotational movement.

16. A portable digital communication apparatus as claimed in claim 15, wherein, when the hinge unit is completely rotated from the first lateral surfaces to the second lateral surfaces, the hinge unit, which is positioned adjacent and parallel to the second lateral surfaces, defines an open space between parts of the first and second housings.

17. A portable digital communication apparatus as claimed in claim 15, wherein a sliding movement distance of the sliding/rotational hinge means depends on its rotational radius.

18. A portable digital communication apparatus as claimed in claim 15, wherein the sliding/rotational hinge means is adapted to perform a first linear sliding movement to move the hinge unit away from the first lateral surfaces; perform a rotational movement within a predetermined angle; and perform a second linear sliding movement to move the hinge unit toward the second lateral surfaces and is disposed adjacent to the lateral second surfaces.

19. A portable digital communication apparatus as claimed in claim 18, wherein the first linear sliding movement is directed parallel to a longitudinal direction of the first and second housings, and the second linear sliding movement is directed perpendicularly to the longitudinal direction of the first and second housings.

20. A portable digital communication apparatus as claimed in claim 15, wherein the sliding/rotational hinge means is provided with an auxiliary display unit and a camera lens disposed adjacent to the auxiliary display unit.

* * * * *